United States Patent
Hayashi

(10) Patent No.: US 12,160,663 B2
(45) Date of Patent: Dec. 3, 2024

(54) IMAGE PROCESSING DEVICE, IMAGE PROCESSING METHOD, AND THREE-DIMENSIONAL SHAPE MEASURING DEVICE

(71) Applicant: Tokyo Seimitsu Co., Ltd., Tokyo (JP)

(72) Inventor: Kyohei Hayashi, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 113 days.

(21) Appl. No.: 18/111,139

(22) Filed: Feb. 17, 2023

(65) Prior Publication Data

US 2023/0269470 A1   Aug. 24, 2023

(30) Foreign Application Priority Data

Feb. 18, 2022 (JP) ................. 2022-024137

(51) Int. Cl.
*H04N 23/67* (2023.01)
*G06T 5/10* (2006.01)
*G06T 7/62* (2017.01)
*G06T 17/00* (2006.01)
*G06V 10/60* (2022.01)

(52) U.S. Cl.
CPC .......... *H04N 23/675* (2023.01); *G06T 5/10* (2013.01); *G06T 7/62* (2017.01); *G06T 17/00* (2013.01); *G06V 10/60* (2022.01); *G06T 2207/10148* (2013.01)

(58) Field of Classification Search
CPC .. G06T 7/62; G06T 7/571; G06T 5/73; G06T 5/10; G06T 17/00; G06T 2207/10148; G06T 2207/20056; H04N 23/675; H04N 23/80; H04N 23/676; G06V 10/60
USPC .......................................... 348/345
See application file for complete search history.

(56) References Cited

U.S. PATENT DOCUMENTS

| | | | |
|---|---|---|---|
| 9,295,431 B2 * | 3/2016 | Hong | G06T 7/571 |
| 9,726,876 B2 * | 8/2017 | Bryll | G02B 27/0075 |
| 10,101,572 B2 * | 10/2018 | Bryll | H04N 23/62 |
| 10,578,827 B2 * | 3/2020 | Cook | G02B 21/241 |
| 10,964,003 B2 * | 3/2021 | Nishina | G06T 7/44 |
| 2013/0016192 A1 | 1/2013 | Shibata | |
| 2013/0088489 A1 * | 4/2013 | Schmeitz | G06T 5/20 |
| | | | 345/419 |
| 2013/0107007 A1 * | 5/2013 | Hong | G06T 7/571 |
| | | | 348/46 |

(Continued)

FOREIGN PATENT DOCUMENTS

| | | |
|---|---|---|
| JP | 2013-20140 A | 1/2013 |
| WO | WO 2009/096422 A1 | 8/2009 |

*Primary Examiner* — Pritham D Prabhakher
(74) *Attorney, Agent, or Firm* — Birch, Stewart, Kolasch & Birch, LLP

(57) ABSTRACT

An image processing device acquires a plurality of images of an object to be measured by an imaging device, the plurality of images being taken while varying a focal position, and corrects blurring in the acquired plurality of images based on a point spread function for each focal position of an image forming optical system in the imaging device. The image processing device also calculates, for the plurality of images after correction of the blurring, an evaluation value for a focusing degree for each pixel, and generates three-dimensional shape data of the object to be measured based on the calculated evaluation value for the focusing degree for each pixel.

15 Claims, 10 Drawing Sheets

(56) References Cited

U.S. PATENT DOCUMENTS

2015/0145980 A1* 5/2015 Bryll .................... G02B 21/241
                                                            348/79
2018/0143419 A1* 5/2018 Bryll ....................... G02F 1/113
2019/0331873 A1* 10/2019 Cook ..................... H04N 23/60
2019/0340735 A1* 11/2019 Nishina ................... G06T 5/73

* cited by examiner

IMAGE PROCESSING DEVICE, IMAGE PROCESSING METHOD, AND THREE-DIMENSIONAL SHAPE MEASURING DEVICE

CROSS-REFERENCE TO RELATED APPLICATIONS

This application claims the priority benefit under 35 U.S.C. § 119 of Japanese Patent Application No. 2022-024137 filed on Feb. 18, 2022, which is hereby incorporated in its entirety by reference.

BACKGROUND OF THE INVENTION

Field of the Invention

The presently disclosed subject matter relates to image processing devices, image processing methods, and three-dimensional shape measuring devices, and more particularly relates to an image processing device, an image processing method, and a three-dimensional shape measuring device for processing a plurality of images of an object to be measured taken while varying a focal position.

Description of the Related Art

A focus variation method (focus shift method) is known as a method of measuring three-dimensional shapes using optical microscopes (for example, Japanese Patent Application Laid-Open No. 2013-020140, and International Publication No. 2009/096422). In the focus variation method, a plurality of images of an object to be measured which are different in focal position are taken, and the three-dimensional shape of the object to be measured is measured based on a degree of focusing of each pixel. Specifically, the three-dimensional shape is measured by calculating an evaluation value for the focusing degree for each pixel from each of the obtained images, specifying the focal position at which the calculated evaluation value is the highest, and thereby specifying the height of the object to be measured at the position corresponding to each pixel.

CITATION LIST

Patent Literature 1: Japanese Patent Application Laid-Open No. 2013-020140
Patent Literature 2: International Publication No. 2009/096422

SUMMARY OF THE INVENTION

The focus variation method typically has an advantage that a low-cost measuring machine can be implemented because it is not necessary to incorporate special ingenuity in an optical system, as compared with other measuring methods such as white light interferometry.

On the other hand, in the focus variation method, when a portion with high reflectivity and a portion with low reflectivity coexist in a visual field, the portion with low reflectivity may not be measured properly. This problem arises because the contrast of a blurring boundary in the portion with high reflectivity is stronger than the contrast of the surface of the portion with low reflectivity. FIG. 10 illustrates an example of a taken image when the portion with high reflectivity and the portion with low reflectivity coexist in the visual field. FIG. 10 illustrates an example in the case where a conical-shaped object is imaged while varying the focal position under vertical illumination. FIG. 10 illustrates an example of an image sliced in an xz plane to make it easier to understand influence of blurring in accordance with the focal position. In FIG. 10, a triangular-shaped line L represents an original shape of the object to be measured. When the conical-shaped object is imaged under vertical illumination, an apex illustrates strong reflection against the inclined surface with low reflectivity. As a result, as illustrated in a region C indicated by an oval in FIG. 10, the contrast of the blurring of the apex with strong reflection exceeds the surface contrast of the original shape, which hinders proper measurement.

As a solution to the problem, there is a method using a polarizing filter (a method using a polarizing filter to reduce direct reflection and acquire scattered light). However, using the polarizing filter has disadvantages that the light amount considerably decreases and the time taken for exposure is prolonged. The prolonged exposure time leads to prolonged measurement time. The use of the polarizing filter also leads to an increase in the number of components.

The presently disclosed subject matter has been made in view such circumstances, and it is an object of the presently disclosed subject matter to provide an image processing device, an image processing method, and a three-dimensional shape measuring device capable of accurately acquiring three-dimensional shape data of an object to be measured.

In order to accomplish the object, an image processing device according to a first aspect of the presently disclosed subject matter is an image processing device for processing a plurality of images of an object to be measured, the plurality of images being taken while varying a focal position. The image processing device includes an image acquiring unit configured to acquire the plurality of images of the object to be measured, an image processing unit configured to process the plurality of images to correct blurring in the images based on a point spread function for each focal position of an optical system in an imaging device that takes the plurality of images, and a three-dimensional shape data generating unit configured to calculate, for the plurality of images after correction of the blurring, an evaluation value for a focusing degree for each pixel and generate three-dimensional shape data of the object to be measured based on the calculated evaluation value for the focusing degree for each pixel.

An image processing device according to a second aspect of the presently disclosed subject matter relates to the image processing device according to the first aspect, in which the image processing unit applies, to the images in a frequency domain obtained by Fourier transform of the images, a frequency-domain restoration filter based on the point spread function to correct the images in the frequency domain, and performs an inverse Fourier transform on the corrected images in the frequency domain to correct the blurring in the images.

An image processing device according to a third aspect of the presently disclosed subject matter relates to the image processing device according to the second aspect, in which a frequency-domain inverse filter is calculated from the point spread function in the frequency domain that is obtained by the Fourier transform of the point spread function, and the calculated frequency-domain inverse filter is set as the frequency-domain restoration filter.

An image processing device according to a fourth aspect of the presently disclosed subject matter relates to the image processing device according to the second aspect, in which a Frequency-domain Wiener filter is calculated from the point spread function in the frequency domain that is obtained by the Fourier transform of the point spread function, and the calculated Frequency-domain Wiener filter is set as the frequency-domain restoration filter.

An image processing device according to a fifth aspect of the presently disclosed subject matter relates to the image processing device according to the fourth aspect, in which the Wiener filter is calculated by a following expression:

$$PSF_f^*(\omega_x,\omega_y,\omega_z)/\{PSF_f(\omega_x,\omega_y,\omega_z)PSF_f^*(\omega_x,\omega_y,\omega_z)+SN\}$$

where PSF(x,y,z) is voxel data of the point spread function, $PSF_f(\omega_x,\omega_y,\omega_z)$ is an image of PSF(x,y,z) mapped by Fourier transform, $PSF_f^*(\omega_x,\omega_y,\omega_z)$ is a complex conjugate of $PSF_f(\omega_x,\omega_y,\omega_z)$, and SN is a constant.

An image processing device according to a sixth aspect of the presently disclosed subject matter relates to the image processing device according to the fifth aspect, in which the constant SN is set experimentally.

An image processing device according to a seventh aspect of the presently disclosed subject matter relates to the image processing device according to any one of the first to sixth aspects, in which the image processing unit processes voxel data of the object to be measured based on voxel data of the point spread function to correct the blurring in the plurality of images.

An image processing device according to an eighth aspect of the presently disclosed subject matter relates to the image processing device according to the seventh aspect, in which, when the voxel data of the point spread function is smaller in size than the voxel data of the object to be measured, the image processing unit adjusts the voxel data of the point spread function to be identical in size to the voxel data of the object to be measured by zero padding.

An image processing device according to a ninth aspect of the presently disclosed subject matter relates to the image processing device according to any one of the first to eighth aspects, in which the point spread function is acquired by setting a luminescent point on an optical axis of the optical system and imaging the luminescent point while moving the imaging device relatively to the luminescent point.

An image processing device according to a tenth aspect of the presently disclosed subject matter relates to the image processing device according to the ninth aspect, in which the luminescent point has a diameter that is set to be equal to or less than optical resolution of the imaging device through the optical system.

An image processing device according to an eleventh aspect of the presently disclosed subject matter relates to the image processing device according to the ninth or tenth aspect, in which the luminescent point is formed by a pinhole illumination or a fluorescent bead.

An image processing device according to a twelfth aspect of the presently disclosed subject matter relates to the image processing device according to any one of the first to eleventh aspects, in which the image processing unit acquires information on temperature when the object to be measured is imaged, and corrects the blurring in the plurality of images based on the point spread function corresponding to the acquired temperature.

An image processing device according to a thirteenth aspect of the presently disclosed subject matter relates to the image processing device according to any one of the first to twelfth aspects, in which the plurality of images of the object to be measured are taken such that a maximum value and a minimum value of luminance of the object to be measured are within a dynamic range of imaging by the imaging device.

A three-dimensional shape measuring device according to a fourteenth aspect of the presently disclosed subject matter includes an imaging device configured to take a plurality of images of an object to be measured set on an optical axis of the imaging device while moving relatively to the object to be measured, the plurality of images being different in focal position, and the image processing device according to any one of the first to thirteenth aspects, the image processing device being configured to process the plurality of images of the object to be measured taken by the imaging device.

An image processing method according to a fifteenth aspect of the presently disclosed subject matter is an image processing method of processing a plurality of images of an object to be measured, the plurality of images being taken while varying a focal position. The image processing method includes acquiring the plurality of images of the object to be measured, correcting blurring in the plurality of images based on a point spread function for each focal position of an optical system in an imaging device that takes the plurality of images, and calculating, for the plurality of images after correction of the blurring, an evaluation value for a focusing degree for each pixel and generating three-dimensional shape data of the object to be measured based on the calculated evaluation value for the focusing degree for each pixel.

The presently disclosed subject matter makes it possible to acquire three-dimensional shape data of the object to be measured with high accuracy.

DETAILED DESCRIPTION OF THE EMBODIMENTS

Hereinafter, preferred embodiments of the presently disclosed subject matter are described with reference to the accompanying drawings.

[Three-Dimensional Shape Measuring Device]

Figure 1:
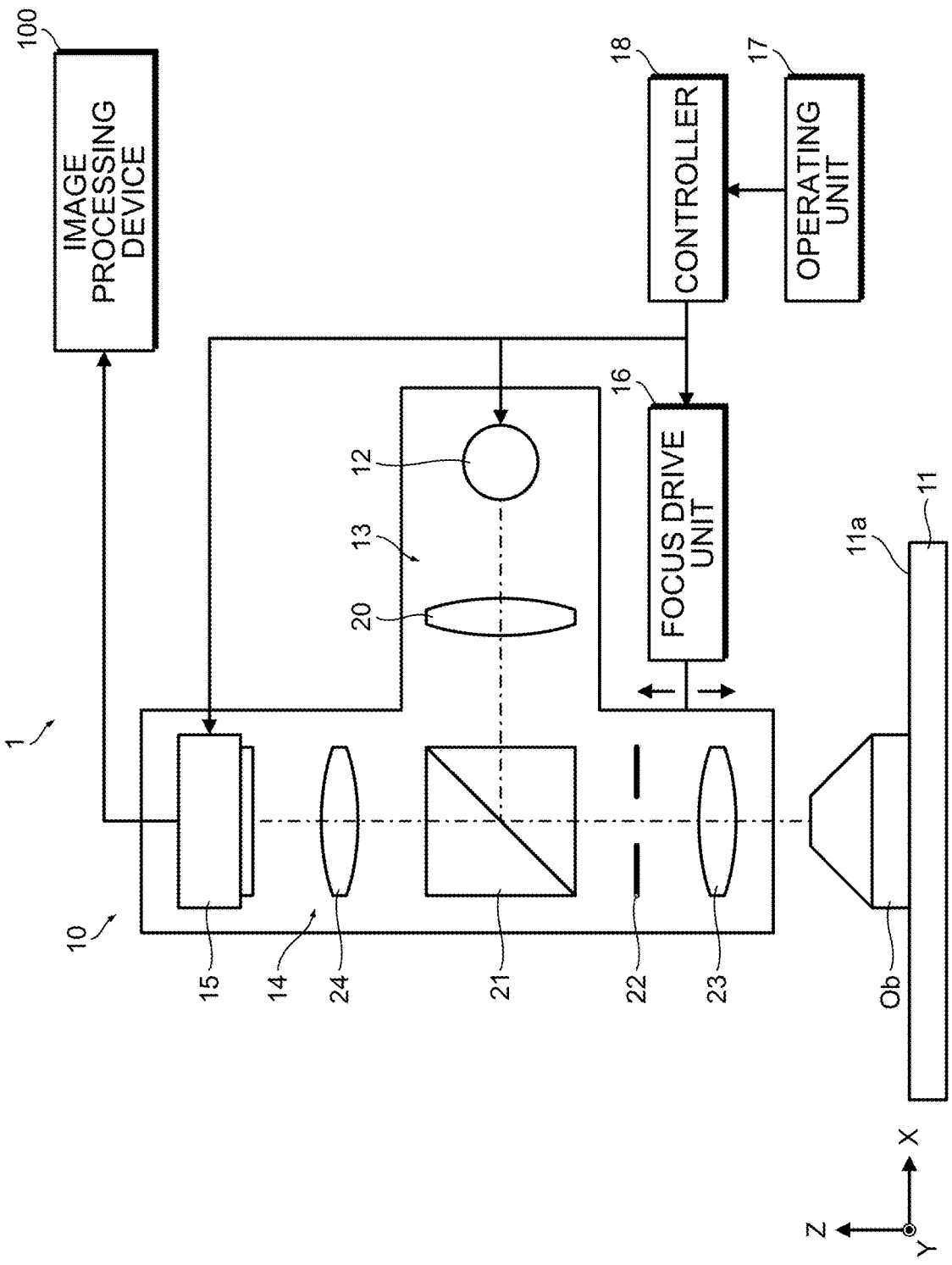
FIG. 1 illustrates a schematic configuration of a three-dimensional shape measuring device.

FIG. 1 illustrates a schematic configuration of a three-dimensional shape measuring device.

As illustrated in FIG. 1, a three-dimensional shape measuring device 1 in the present embodiment includes an imaging device 10 and an image processing device 100.

[Imaging Device]

The imaging device 10 includes a so-called optical microscope, which takes images of an object to be measured Ob while varying a focal position. As illustrated in FIG. 1, the imaging device 10 in the present embodiment includes a stage 11, an illumination light source 12, an illumination optical system 13, an image forming optical system 14, a camera 15, a focus drive unit 16, an operating unit 17, a controller 18, and the others.

The stage 11 has a mounting surface 11a on which the object to be measured Ob is mounted. The mounting surface 11a is configured as a flat surface serving as a reference surface for measurement. Specifically, for the mounting surface 11a, an X axis and a Y axis are set. The X axis and the Y axis are set as two axes orthogonal to each other.

Examples of the illumination light source 12 include a halogen lamp, a metal halide lamp, a mercury lamp, a xenon lamp, and a light emitting diode (LED).

The illumination optical system 13 includes an illumination lens 20, a beam splitter 21, an aperture diaphragm 22, and an objective lens 23. Light (illumination light) emitted from the illumination light source 12 travels through the illumination lens 20, the beam splitter 21, the aperture diaphragm 22, and the objective lens 23, and irradiates the object to be measured Ob mounted on the stage 11. Also, a configuration is possible in which illumination light is guided from the illumination light source 12 to the illumination optical system 13 using a light guide.

The image forming optical system 14 includes the objective lens 23, the aperture diaphragm 22, the beam splitter 21, and an image forming lens 24. The beam splitter 21, the aperture diaphragm 22, and the objective lens 23 are shared with the illumination optical system 13. The light reflected on the object to be measured Ob travels through the objective lens 23, the aperture diaphragm 22, the beam splitter 21, and the image forming lens 24, and enters the camera 15.

The camera 15 has an image sensor to electronically take images of the object to be measured Ob. Examples of the image sensor include a complementary metal oxide semiconductor (CMOS) image sensor, and a charge-coupled device (CCD) image sensor. An image taken by the camera 15 is output to the image processing device 100.

The focus drive unit 16 integrally moves the illumination light source 12, the illumination optical system 13, the image forming optical system 14, and the camera 15 along the imaging optical axis to vary the focal position. The imaging optical axis is set orthogonally to the mounting surface 11a of the stage 11. Therefore, the illumination light source 12, the illumination optical system 13, the image forming optical system 14, and the camera 15 move perpendicularly to the mounting surface 11a of the stage 11. An axis parallel to the imaging optical axis is defined as a Z axis. The focus drive unit 16 includes a guide mechanism and a drive mechanism. The guide mechanism guides a unit (optical head) including the illumination light source 12, the illumination optical system 13, the image forming optical system 14, and the camera 15, along the Z axis. The drive mechanism includes, for example, a feed screw mechanism and a motor that drives the feed screw mechanism.

The operating unit 17 has various operation buttons to operate the imaging device 10 so as to accept operation input from a user. The various operation buttons include a touch panel.

The controller 18 integrally controls the entire operation of the imaging device 10. Specifically, the controller 18 performs light emission control for the illumination light source 12, imaging control for the camera 15, drive control (feed control) for the focus drive unit 16, or the like. The controller 18 includes a computer. Specifically, the computer functions as the controller 18 by executing a prescribed program.

The imaging device 10 configured as described above images the object to be measured Ob mounted on the stage 11 while varying the focal position at a constant pitch. Specifically, the focus drive unit 16 moves the optical head along the Z axis at a constant pitch, and at each position, the object to be measured Ob is imaged. The taken images are sequentially output to the image processing device 100.

[Image Processing Device]

Figure 2:
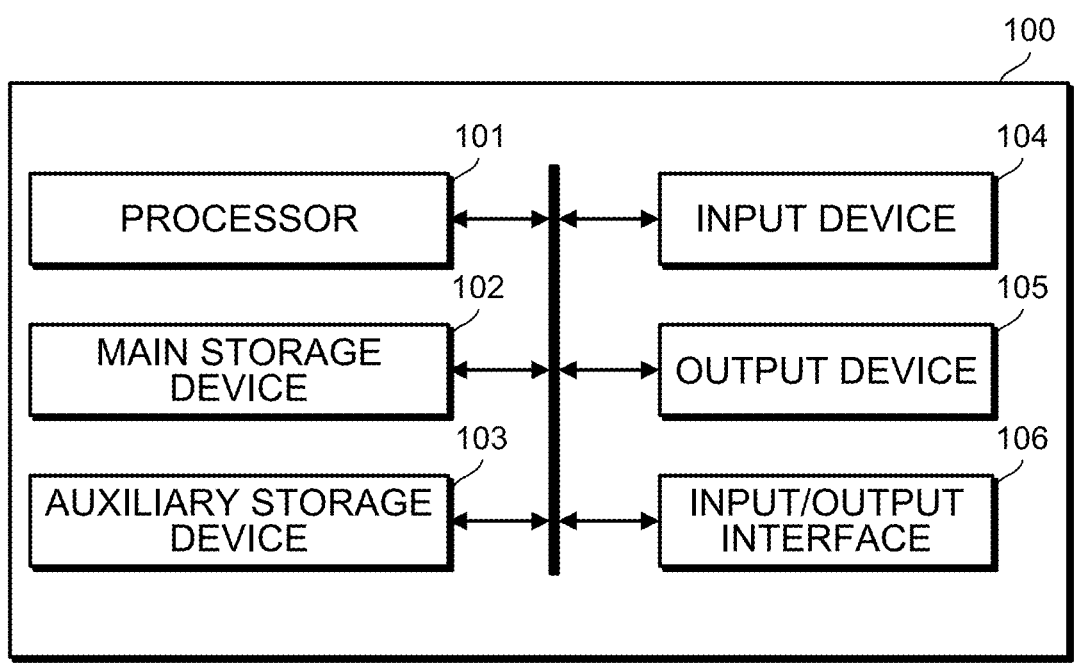
FIG. 2 illustrates an example of a hardware configuration of an image processing device.

FIG. 2 illustrates an example of the hardware configuration of the image processing device.

The image processing device 100, which includes a so-called computer, includes a processor 101, a main storage device (main memory) 102, an auxiliary storage device (storage) 103, an input device 104, an output device 105, an input/output interface 106, and the others.

The processor 101 includes, for example, a central processing unit (CPU), a graphics processing unit (GPU), or the like.

The main storage device 102 includes, for example, a dynamic random access memory (DRAM), a static random access memory (SRAM), or the like.

The auxiliary storage device 103 includes, for example, a solid state drive (SSD), a hard disk drive (HDD), or the like. The auxiliary storage device 103 stores programs executed by the processor 101, and various data.

The processor 101 implements various functions as described later by reading the programs stored in the auxiliary storage device 103, and expanding and executing the programs on the main storage device 102.

The input device 104 is a device that allows the user to enter instructions to the image processing device 100. The input device 104 includes, for example, a mouse, a keyboard, a touch panel, or the like.

The output device 105 is a device that performs output (including display) of measurement results or the like. The output device 105 includes, for example, a liquid crystal display (LCD), an organic electroluminescent display (OELD), or the like.

The input/output interface 106 is an interface for connecting input and output devices and includes, for example, a universal serial bus (USB) or the like. The camera 15 of the imaging device 10 is connected to the image processing device 100 via the input/output interface 106.

Figure 3:
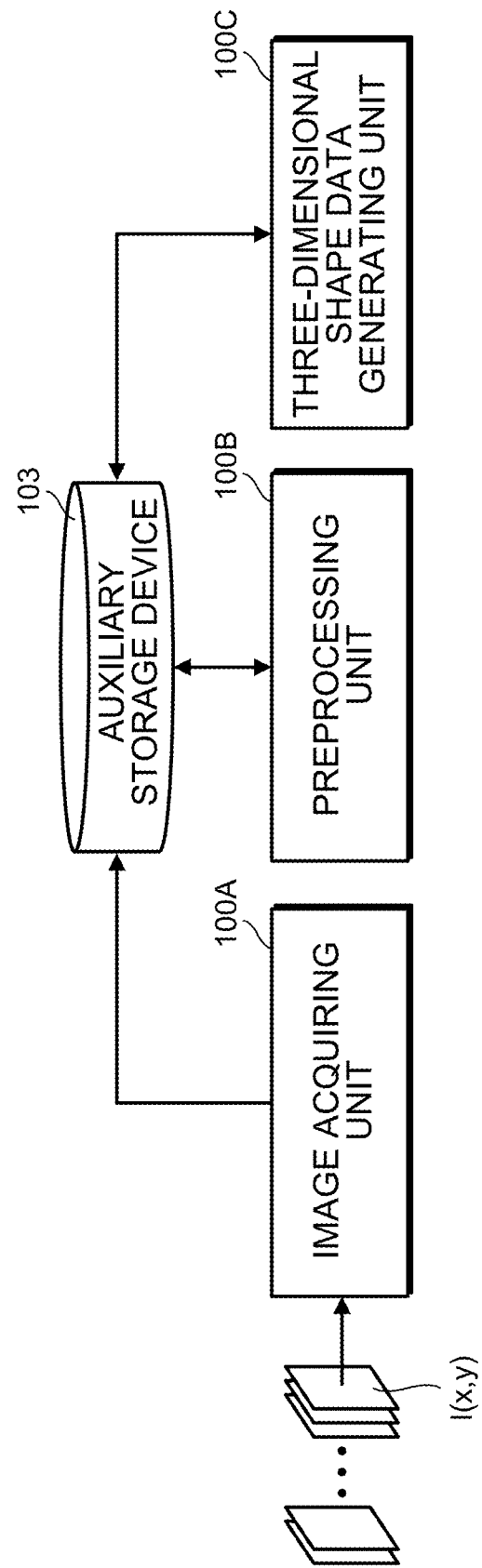
FIG. 3 is a block diagram of functions included in the image processing device.

FIG. 3 is a block diagram of functions included in the image processing device.

As illustrated in FIG. 3, the image processing device 100 achieves the functions of an image acquiring unit 100A, a preprocessing unit 100B, and a three-dimensional shape data generating unit 100C. The function of each unit is achieved by the processor 101 executing a prescribed program (image processing program).

The image acquiring unit 100A acquires image data of the object to be measured Ob taken by the imaging device 10. The image data is the image data (so-called multifocal image data) on images of the object to be measured Ob taken while varying the focal position. A series of acquired image data is recorded in the auxiliary storage device 103.

The preprocessing unit 100B performs processing to correct blurring in images through image processing, which is performed as preprocessing on a series of image data. A detail of the image processing will be described later. In the present embodiment, the preprocessing unit 100B is an example of the image processing unit. The preprocessed image data is recorded in the auxiliary storage device 103.

The three-dimensional shape data generating unit 100C applies an algorithm of a focus variation method to the preprocessed image data to generate three-dimensional shape data of the object to be measured Ob. Here, the three-dimensional shape data means a group of data in which each of all the pixels in the image of the object to be measured has assigned height information of the object to be measured expressed by the pixel. By acquiring the three-dimensional shape data, it becomes possible to display the object to be measured Ob in three dimensional computer graphics. Since the focus variation method itself is a known technique, the detailed description thereof is omitted. The three-dimensional shape data is generated from a multifocal image of the object to be measured Ob roughly in the following procedure. First, differential operation is performed on each pixel of the obtained image to calculate an evaluation value for a focusing degree. The focusing degree is a numerical value indicating the degree of focus. Then, for each of the pixels in the image of the object to be measured, a focal position at which the focusing degree is maximum is specified. Based on the information on the specified focal position, height information of the object to be measured Ob at the position corresponding to each of the pixels is obtained. For example, in the case of a pixel located at coordinates (xn,yn), the focal position, at which the evaluation value for the focusing degree is maximum, is assumed to be Pn. In this case, a height zn associated with the focal position Pn is acquired as the height information for the pixel located at the coordinates (xn,yn). By acquiring the height information for all the pixels, the three-dimensional shape data of the object to be measured Ob can be acquired. Imaging operation is typically performed while varying the focal position at a constant pitch from the reference point (origin). It is also possible to assign the order of imaging as the height information. The obtained three-dimensional shape data is associated with the image data obtained by imaging, and recorded in the auxiliary storage device 103.

[Preprocessing]

As described above, in the focus variation method, when there is a portion with high reflectivity and a portion with low reflectivity coexists in the visual field, the contrast of a blurring boundary in the portion with high reflectivity is stronger than the contrast of the surface of the portion with low reflectivity, which causes a problem that a correct height in the portion with low reflectivity cannot be acquired.

Therefore, in the present embodiment, the influence of the blurring in the portion with high reflectivity is reduced by applying the prescribed image processing to the images obtained by imaging. Specifically, image restoration processing is performed using a restoration filter based on a point spread function (PSF) of the image forming optical system 14 in the imaging device 10. The point spread function is also called a point image distribution function and a blurring function.

First, the image restoration process using the restoration filter will be described.

Figure 4:
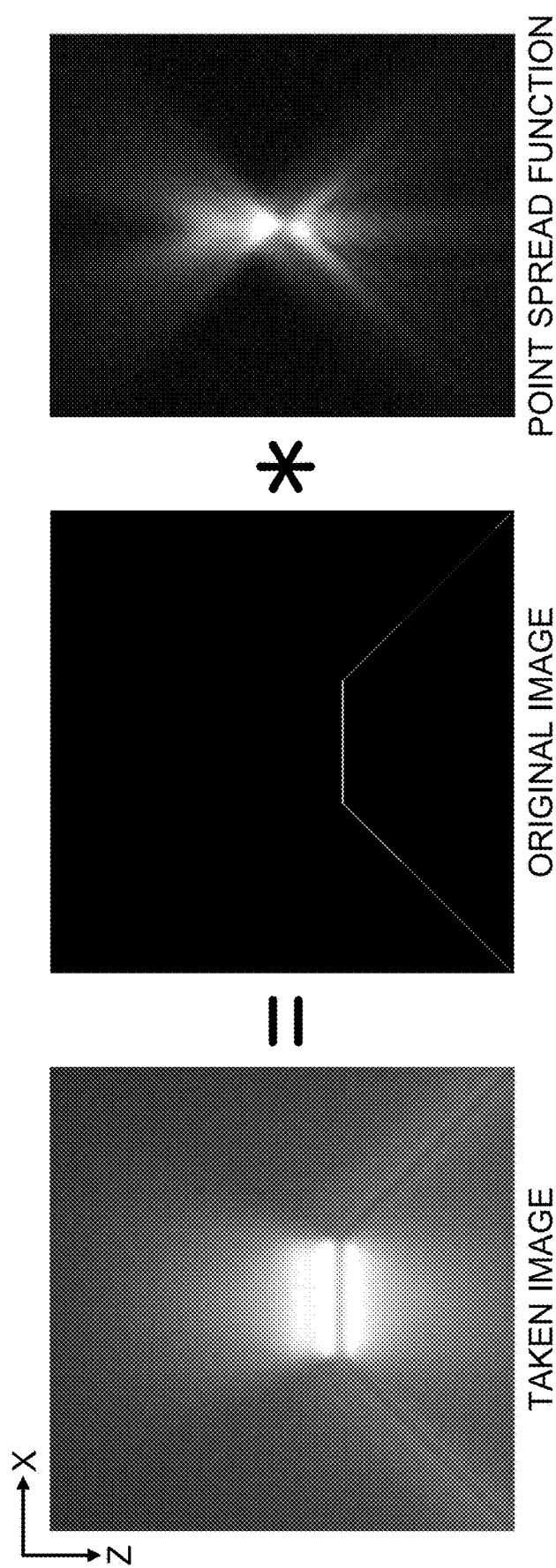
FIG. 4 is a conceptual view of an image taken through an image forming optical system.

FIG. 4 is a conceptual view of imaging through the image forming optical system. FIG. 4 illustrates how an object to be measured in space is imaged, in imaging with use of lenses. FIG. 4 illustrates an example of an image that is sliced in the xz plane to make it easier to understand the influence of blurring in accordance with the focal position. The image sliced in the xz plane is generated by extracting from each image a specific pixel row parallel to the x axis. The example illustrated in FIG. 4 indicates the case where the image is generated by extracting, from each image, a pixel row extending through the center of the image and parallel to the x axis. The object to be measured has a truncated conical shape.

Now, assume that an ideal image (original image) of the object to be measured is IO(x,y), and the point spread function of the image forming optical system 14 is PSF(x,y).

The image I(x,y) to be taken can be expressed as $$I(x,y)=IO(x,y)*PSF(x,y) \quad \text{expression (1)}.$$

Here, "*" represents convolution operation.

The image restoration processing is to restore the original image IO(x,y) of the object to be measured Ob without the influence of blurring from the taken image I(x,y) when the point spread function PSF(x,y) is known. This operation is called deconvolution.

Two-dimensional Fourier transform of expression (1) results in $$I_f(\omega_x,\omega_y)=IO_f(\omega_x,\omega_y)PSF_f(\omega_x,\omega_y) \quad \text{expression (2)}.$$

Here, $I_f(\omega_x,\omega_y)$ represents the Fourier transform of I(x,y). The term $IO_f(\omega_x,\omega_y)$ represents the Fourier transform of IO(x,y). The term $PSF_f(\omega_x,\omega_y)$ represents the Fourier transform of PSF(x,y). Here, $(\omega_x,\omega_y)$ represents spatial frequency coordinates.

Since the point spread function PSF(x,y) is known, the point spread function in the frequency domain $PSF_f(\omega_x,\omega_y)$ is also known. Dividing $I_f(\omega_x,\omega_y)$ by $PSF_f(\omega_x,\omega_y)$ results in $$IC_f(\omega_x,\omega_y)=I_f(\omega_x,\omega_y)/PSF_f(\omega_x,\omega_y)=IO_f(\omega_x,\omega_y) \quad \text{expression (3)}.$$

As a result, the restored image in the frequency domain $IC_f(\omega_x,\omega_y)$ is obtained. When inverse Fourier transform is performed on $IC_f(\omega_x,\omega_y)$, a restored image IC(x,y) in spatial coordinates is obtained. Thus, $1/PSF_f(\omega_x,\omega_y)$ is referred to as an inverse filter.

The image processing device 100 in the present embodiment uses the inverse filter $1/PSF_f(\omega_x,\omega_y)$ as the restoration filter to perform the image restoration processing.

The inverse filter $1/PSF_f(\omega_x,\omega_y)$ is set for each focal position. The information on the set inverse filter 1/P(u,v) is acquired in advance and recorded in the auxiliary storage device 103. The preprocessing unit 100B reads the information on the inverse filter $1/PSF_f(\omega_x,\omega_y)$ recorded in the auxiliary storage device 103, and performs the image restoration processing. A method of generating the inverse filter $1/PSF_f(\omega_x,\omega_y)$ will be described later.

The preprocessing unit 100B performs the image restoration process in a following procedure.

Here, description is given of the case of processing the image data I(x,y) on the image taken at the focal position Pn.

First, Fourier transform of the image data I(x,y) to be processed is performed to map the image data to the frequency domain.

$$I(x,y) \rightarrow I_f(\omega_x,\omega_y)$$

The term $I_f(\omega_x,\omega_y)$ indicates image data in the frequency domain.

Next, information on the frequency-domain inverse filter $1/PSF_f(\omega_x,\omega_y)$ corresponding to the focal position Pn is acquired.

Then, the image data $I_f(\omega_x,\omega_y)$ in the frequency domain is multiplied by the frequency-domain inverse filter $1/PSF_f(\omega_x,\omega_y)$ to calculate $IC_f(\omega_x,\omega_y)$.

$$IC_f(\omega_x,\omega_y)=I_f(\omega_x,\omega_y) \times [1/PSF_f(\omega_x,\omega_y)]$$

The calculated $IC_f(\omega_x,\omega_y)$ is subjected to inverse Fourier transform to acquire an absolute value of each pixel, and to thereby obtain the restored image IC(x,y).

The preprocessing unit 100B performs image restoration processing on the image data of each image obtained by imaging, and corrects the blurring. The image data after blurring correction is recorded in the auxiliary storage device 103.

[Method of Acquiring Point Spread Function]

Figure 5:
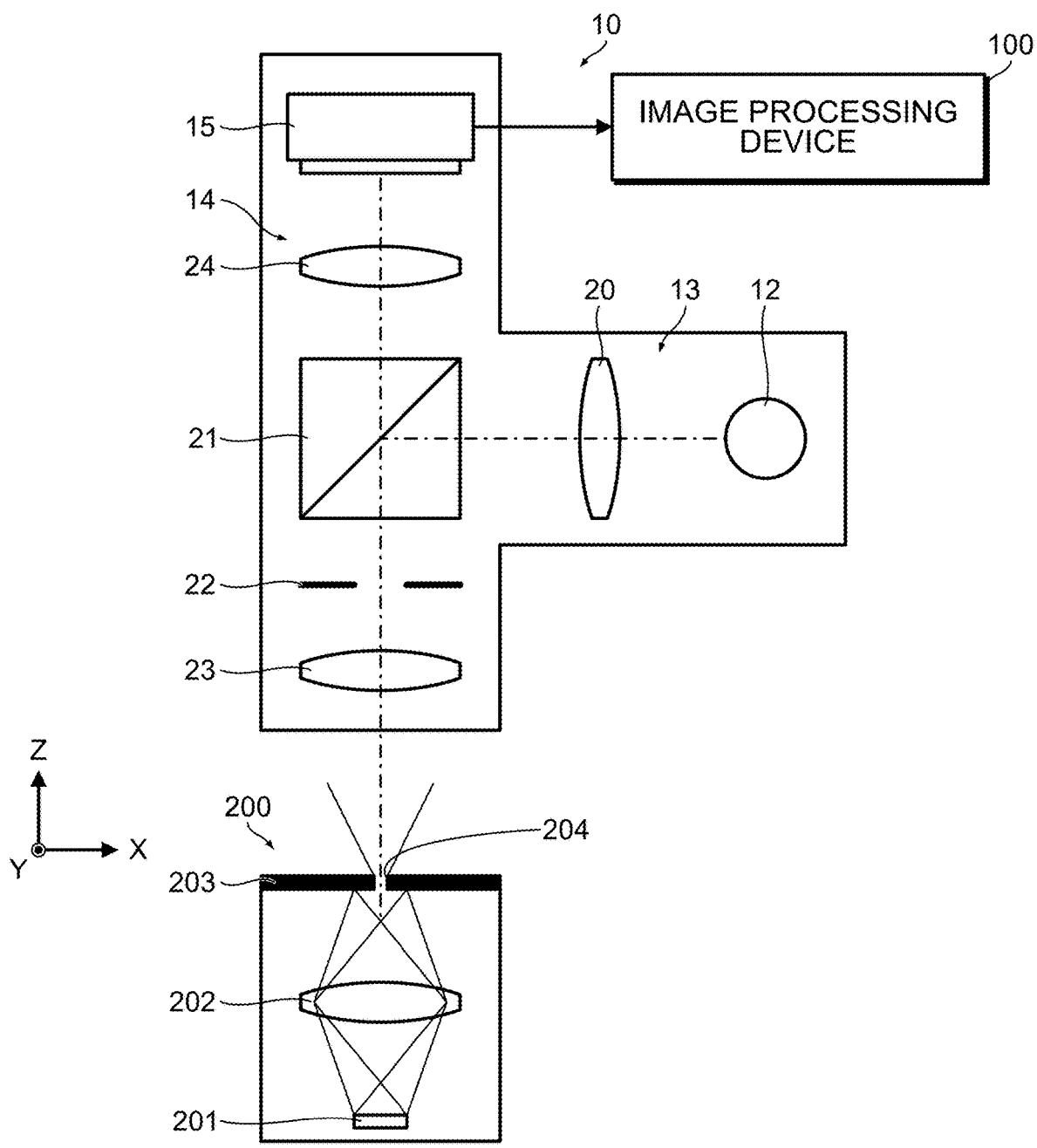
FIG. 5 illustrates an example of a method of acquiring a point spread function of the image forming optical system.

FIG. 5 illustrates an example of a method of acquiring the point spread function of the image forming optical system.

FIG. 5 illustrates an example in the case where the point spread function of the image forming optical system 14 is measured using a pinhole illumination 200.

As illustrated in FIG. 5, a luminescent point is generated by the pinhole illumination 200 at the position of the reference surface, and images of the luminescent point are taken while varying the focal position. The luminescent point is set on the optical axis of the image forming optical system 14. As a result, the point spread function for each focal position is obtained. The point spread function for each focal position is included in voxel data PSF(x,y,z) of the point spread function. Here, z represents the position (height) in the z-axis direction corresponding to the focal position.

The pinhole illumination 200 includes a light source 201, a condenser lens 202, and a pinhole plate 203. The pinhole plate 203 has a pinhole 204. In the pinhole illumination 200, light from the light source 201 is condensed by the condenser lens 202, and the condensed light is emitted through the pinhole 204 provided in the pinhole plate 203. The light emitted through the pinhole 204 forms a luminescent point. The pinhole 204 is arranged on the reference surface and on the optical axis of the image forming optical system 14. The pinhole 204 has a diameter set to be equal to or less than the optical resolution of the imaging device 10 through the image forming optical system 14.

The luminescent point can also be generated by other methods. For example, a fluorescent bead can be used to generate the luminescent point. The method using the fluorescent bead is a method in which a small fluorescent bead is excited with external illumination and excited fluorescence is imaged. In this case, the fluorescent bead also has a diameter that is set to be equal to or less than the optical resolution of the imaging device 10 through the image forming optical system 14.

Since the point spread function obtained by the above methods is the function specific to the image forming optical system, it is not necessary to acquire the point spread function again unless the camera or the optical system are changed. However, in the environment where the temperature greatly varies, it is desirable to acquire the point spread function according to the temperature. In that case, in the image restoration processing, information on the temperature during imaging the object to be measured is acquired, and the image restoration processing is carried out based on the point spread function corresponding to the acquired temperature. In other words, the image restoration processing is carried out using a restoration filter corresponding to the temperature (a frequency-domain restoration filter).

[Generation of Restoration Filter]

When the inverse filter is used as a restoring filter, the Fourier transform of the point spread function PSF(x,y) is performed to calculate $PSF_f(\omega_x,\omega_y)$, and its inverse $1/PSF_f(\omega_x,\omega_y)$ is further calculated to generate the inverse filter.

In the above embodiment, the configuration is adopted in which the frequency-domain inverse filter is obtained and held in advance. However, a configuration is also possible in which the frequency-domain inverse filter is calculated and acquired during the image restoration processing.

When the image to be processed and the point spread function to be used are difference in size, then, for example, zero padding is performed on the point spread function to match the size of the image and the size of the point spread function.

[Measurement Operation]

Figure 6:
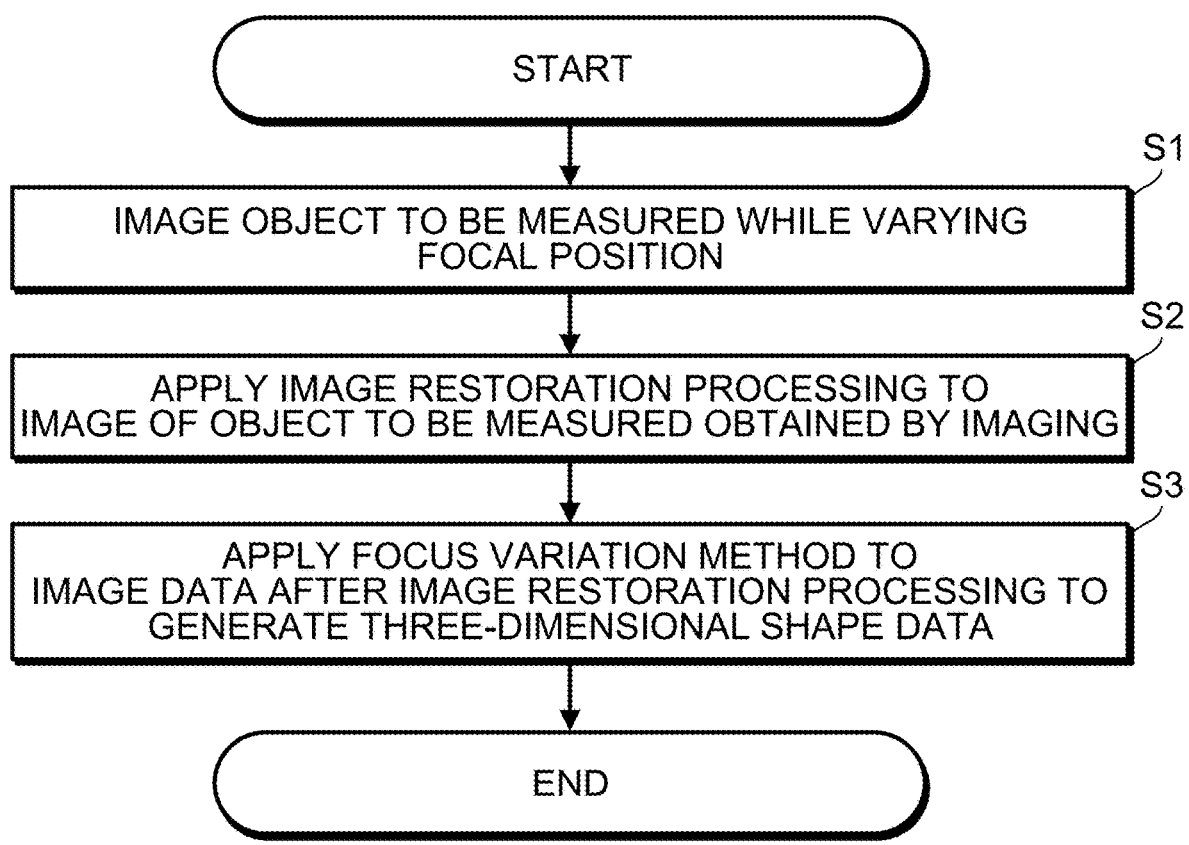
FIG. 6 is a flowchart illustrating a measurement procedure with the three-dimensional shape measuring device.

FIG. 6 is a flowchart illustrating a measurement procedure with the three-dimensional shape measuring device.

First, the imaging device 10 takes images of the object to be measured Ob (step S1). Specifically, the object to be measured Ob is mounted on the stage 11, and the object to be measured Ob mounted on the stage 11 is imaged with the camera 15 while varying the focal position at a constant pitch. The image data of the images obtained by imaging are sequentially output to the image processing device 100. The image processing device 100 acquires the image data output from the imaging device 10 and records the image data in the auxiliary storage device 103.

The image data of the images acquired by imaging is then subjected to image restoration processing, which is performed as preprocessing (step S2).

As described above, in the image restoration processing, Fourier transform of image data I(x,y) to be processed is performed to calculate $I_f(\omega_x,\omega_y)$, and the calculated $I_f(\omega_x,\omega_y)$ is multiplied by the frequency-domain inverse filter $1/PSF_f(\omega_x,\omega_y)$ to calculate $IC_f(\omega_x,\omega_y)$. The calculated $IC_f(\omega_x,\omega_y)$ is then subjected to inverse Fourier transform to acquire an absolute value of each pixel, so that the restored image IC(x,y) is obtained. As a result, the blurring in the taken images is corrected. The image data after blurring correction is recorded in the auxiliary storage device 103.

Next, the focus variation method is applied to the image data after the image restoration processing to generate three-dimensional shape data (step S3). Specifically, for the plurality of images after correction of the blurring, an evaluation value for a focusing degree for each pixel is calculated, and three-dimensional shape data of the object to be measured Ob is generated based on the calculated evaluation value for the focusing degree for each pixel. Here, the evaluation value for the focusing degree is calculated from the images with the blurring being corrected, so that accurate calculation can be performed. Thus, even when there is a portion with high reflectivity in the image, it is possible to restrain the contrast of the blurring boundary in the portion with high reflectivity form being more enhanced than the contrast of the surface of the portion with low reflectivity. This makes it possible to accurately calculate the evaluation value for the focusing degree in each image. Then, this makes it possible to generate three-dimensional shape data with high accuracy.

[Modification]

[Image Restoration Processing with Voxel Data]

A configuration is also possible in which the image data is acquired as voxel data and image restoration processing is collectively performed. The processing is performed in a following procedure.

Now, assume that I(x,y,z) is the voxel data of the image obtained from imaging. The number of pixels in this case is $(N_x,N_y)$, and the number of slices (the number of positions in the height direction where imaging is performed) is $N_z$.

The voxel data of the point spread function is PSF(x,y,z). The voxel data of the point spread function PSF(x,y,z) is obtained by taking images of the luminescent point set on the reference surface while varying the focal position at a constant pitch.

When the voxel data I(x,y,z) on the images are different in size from the voxel data of the point spread function PSF(x,y,z), zero padding is performed on the voxel data of the point spread function PSF(x,y,z), so as to match the size of the voxel data of the images and the voxel data of the point spread function.

Three-dimensional Fourier transform maps I(x,y,z) to the frequency domain.

$$I(x,y,z) \rightarrow I_f(\omega_x,\omega_y,\omega_z)$$

Three-dimensional Fourier transform maps PSF(x,y,z) to the frequency domain.

$$PSF(x,y,z) \rightarrow PSF_f(\omega_x,\omega_y,\omega_z)$$

From the point spread function in the frequency domain after the Fourier transform $PSF_f(\omega_x,\omega_y,\omega_z)$, a frequency-domain inverse filter $1/PSF_f(\omega_x,\omega_y,\omega_z)$ is generated.

The generated frequency-domain inverse filter $1/PSF_f(\omega_x,\omega_y,\omega_z)$ is applied to the voxel data of the images in the frequency domain $I_f(\omega_x,\omega_y,\omega_z)$ to calculate $IC_f(\omega_x,\omega_y,\omega_z)$.

$$IC_f(\omega_x,\omega_y,\omega_z) = I_f(\omega_x,\omega_y,\omega_z) * [1/PSF_f(\omega_x,\omega_y,\omega_z)]$$

The calculated $IC_f(\omega_x,\omega_y,\omega_z)$ is subjected to inverse Fourier transform to obtain an absolute value of each pixel, and thereby a restored image IC(x,y,z) is obtained.

Thus, a configuration is possible in which image data is acquired as voxel data and image restoration processing is collectively performed.

[Image Restoration Processing with Wiener Filter]

The convolution of the point spread function basically functions as a low pass filter, and so the inverse filter serves as a high pass filter. Therefore, when a simple inverse filter is applied to the taken images of the object to be measured and noise is present on the high-frequency side, the noise increases and affects the image processing in the focus variation method. In other words, in the focus variation method, it is not possible to distinguish between the noise and the reflection of the object to be measured, and therefore the noise appears as measurement error.

Therefore, in this example, the Wiener filter is set as the restoration filter. The Wiener filter minimizes square error between the original image and the restored image.

Hereinafter, the image restoration process using the Wiener filter will be described. Here, the description is given by taking as an example the case where image data is processed as voxel data. The point spread function PSF(x,y,z) is assumed to be acquired in advance.

First, image data I(x,y,z) of taken images of the object to be measured Ob is acquired. As described above, the image data is acquired as voxel data. The number of pixels in this case is $(N_x, N_y)$, and the number of slices is $N_z$.

Next, it is determined whether or not the size of the image data I(x,y,z) matches the size of the point spread function PSF(x,y,z). When the sizes are different, zero padding is applied to the point spread function PSF(x,y,z) to match the sizes.

Then, three-dimensional Fourier transform of the image data I(x,y,z) is performed to map the image data to the frequency domain.

$$I(x,y,z) \rightarrow I_f(\omega_x,\omega_y,\omega_z)$$

Then, three-dimensional Fourier transform of the point spread function PSF(x,y,z) is performed to map the image data to the frequency domain.

$$PSF(x,y,z) \rightarrow PSF_f(\omega_x,\omega_y,\omega_z)$$

Then, the Wiener filter is calculated by a following expression:

$$PSF_f^*(\omega_x,\omega_y,\omega_z)/\{PSF_f(\omega_x,\omega_y,\omega_z)PSF_f^*(\omega_x,\omega_y,\omega_z)+SN\}$$

Here, "$PSF_f^*(\omega_x,\omega_y,\omega_z)$" is complex conjugation of $PSF_f(\omega_x,\omega_y,\omega_z)$, and "SN" is a real number obtained from an SN ratio of the image. For "SN", a constant is set for practical use. However, since "SN" strongly depends on the gain of the camera, it is preferable to adjust the optimal value experimentally. Here, "experimentally" refers to a concept including both "by actual experiments" and "by computer simulations".

The calculated Wiener filter is then applied to $I_f(\omega_x,\omega_y,\omega_z)$ to calculate $IC_f(\omega_x,\omega_y,\omega_z)$.

$$IC_f(\omega_x,\omega_y,\omega_z) = I_f(\omega_x,\omega_y,\omega_z)[PSF_f^*(\omega_x,\omega_y,\omega_z)/\{PSF_f(\omega_x,\omega_y,\omega_z)PSF_f^*(\omega_x,\omega_y,\omega_z)+SN\}]$$

The calculated $IC_f(\omega_x,\omega_y,\omega_z)$ is subjected to inverse Fourier transform to acquire a complex image $IC_c(x,y,z)$. Then, an absolute value of each pixel is acquired from the complex image $IC_c(x,y,z)$, and a final restored image $IC_r(x,y,z)$ is obtained.

In this way, using the Wiener filter as the restoration filter can reduce noise, especially the noise present on the high-frequency side, so that the images with higher quality can be restored. This allows more accurate measurement.

Figure 7:
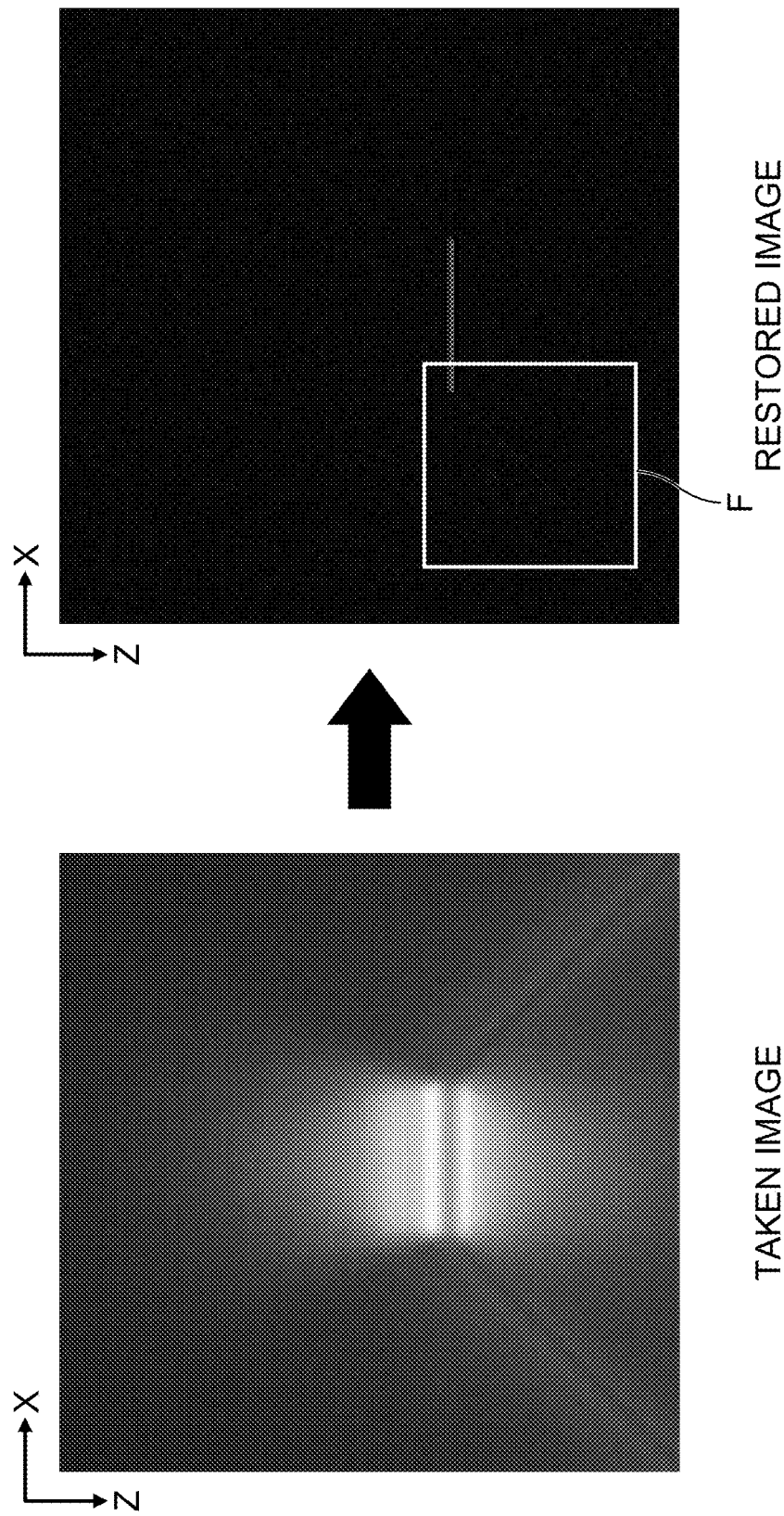
FIG. 7 illustrates an example of image restoration processing with a Wiener filter.

FIG. 7 illustrates an example of the image restoration processing with the Wiener filter. FIG. 7 illustrates an example of an image sliced in the xz plane to make it easier to understand influence of blurring in accordance with the focal position. The object to be measured has a truncated conical shape.

As illustrated in FIG. 7, it can be confirmed that the image restoration processing using the Wiener filter reduces the blurring in the portion with high reflectivity.

Figure 8:
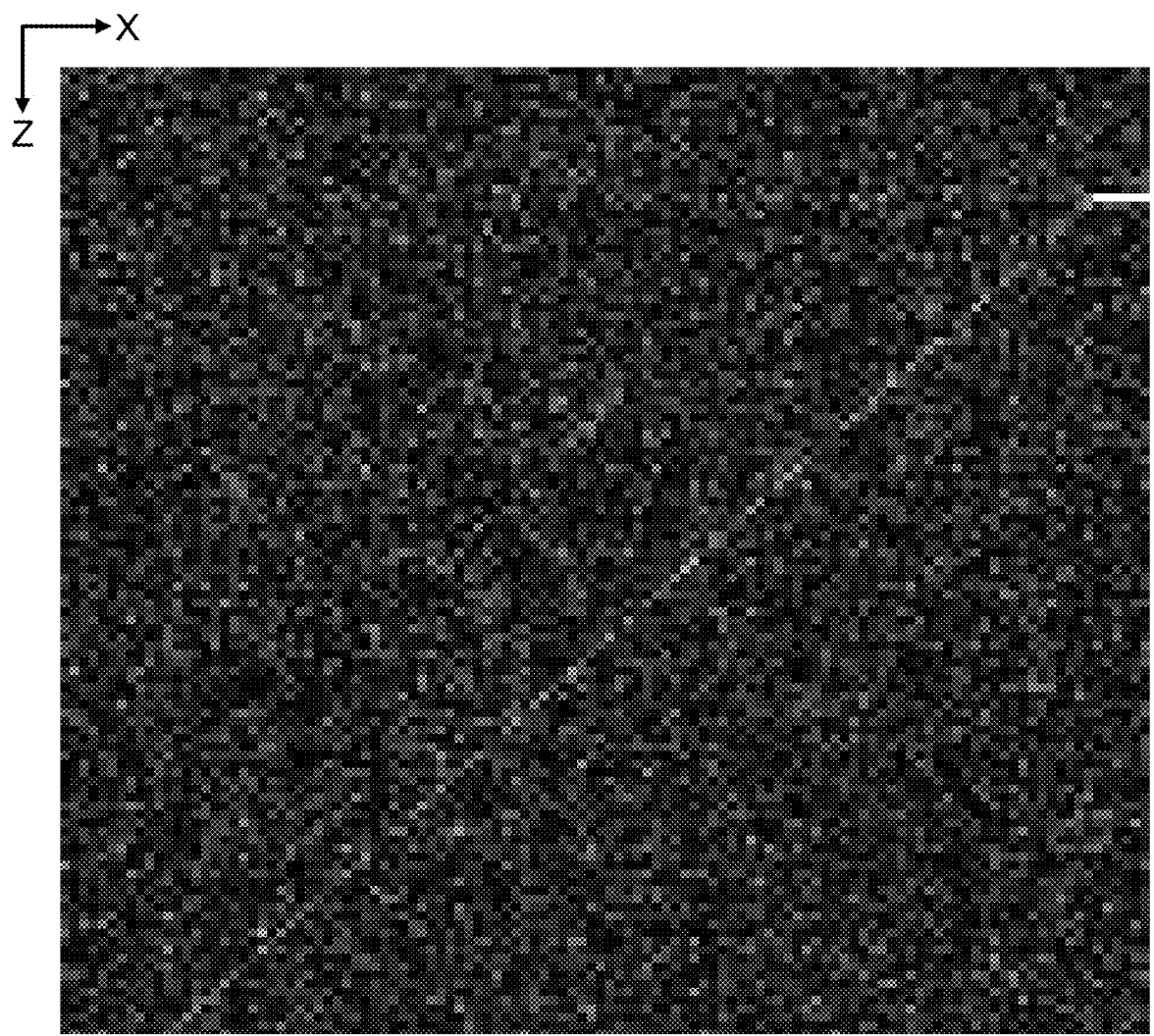
FIG. 8 is a partially enlarged view of FIG. 7.
Figure 9:
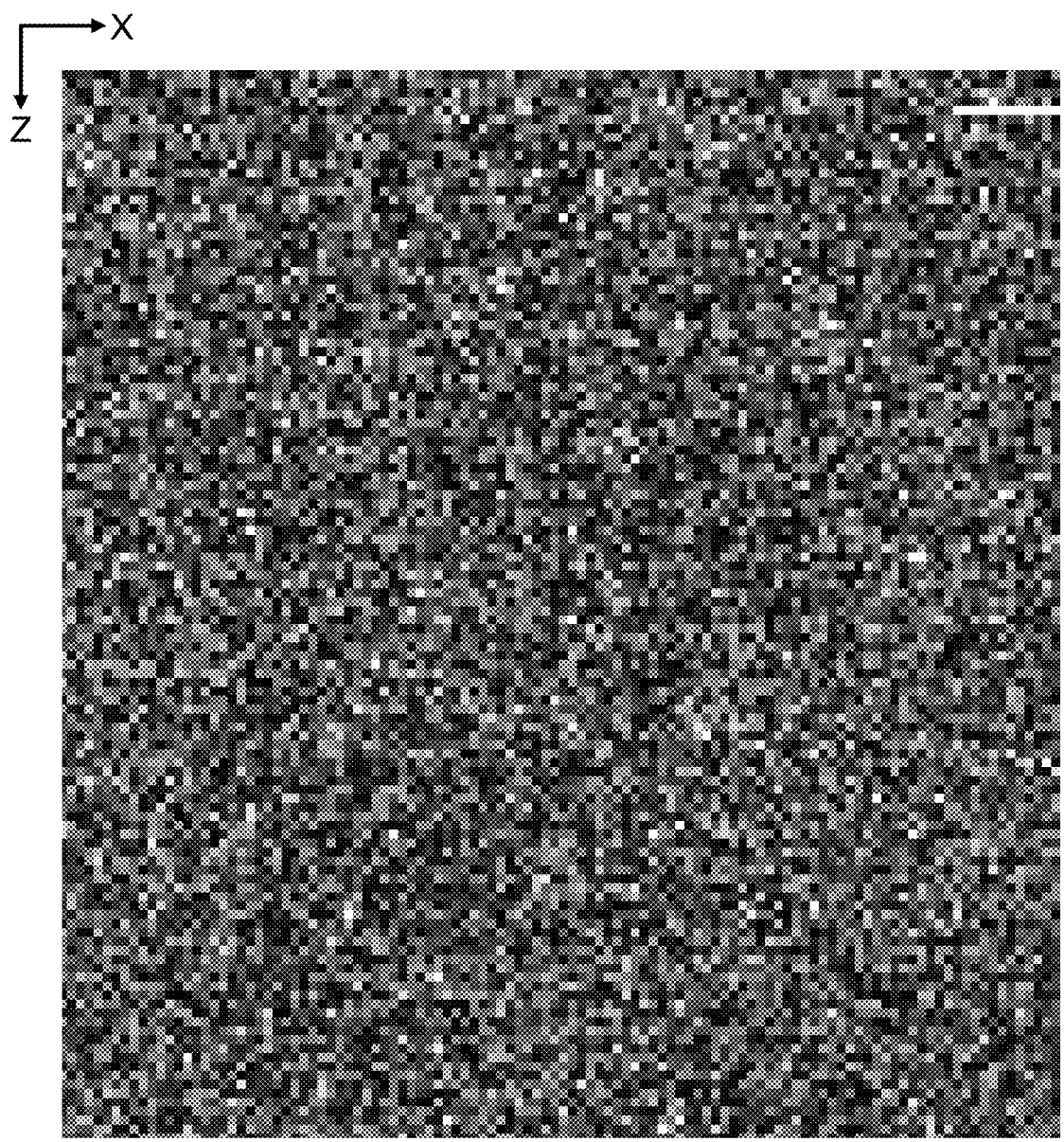
FIG. 9 is a partially enlarged view of an image subjected to image restoration processing using an inverse filter.
Figure 10:
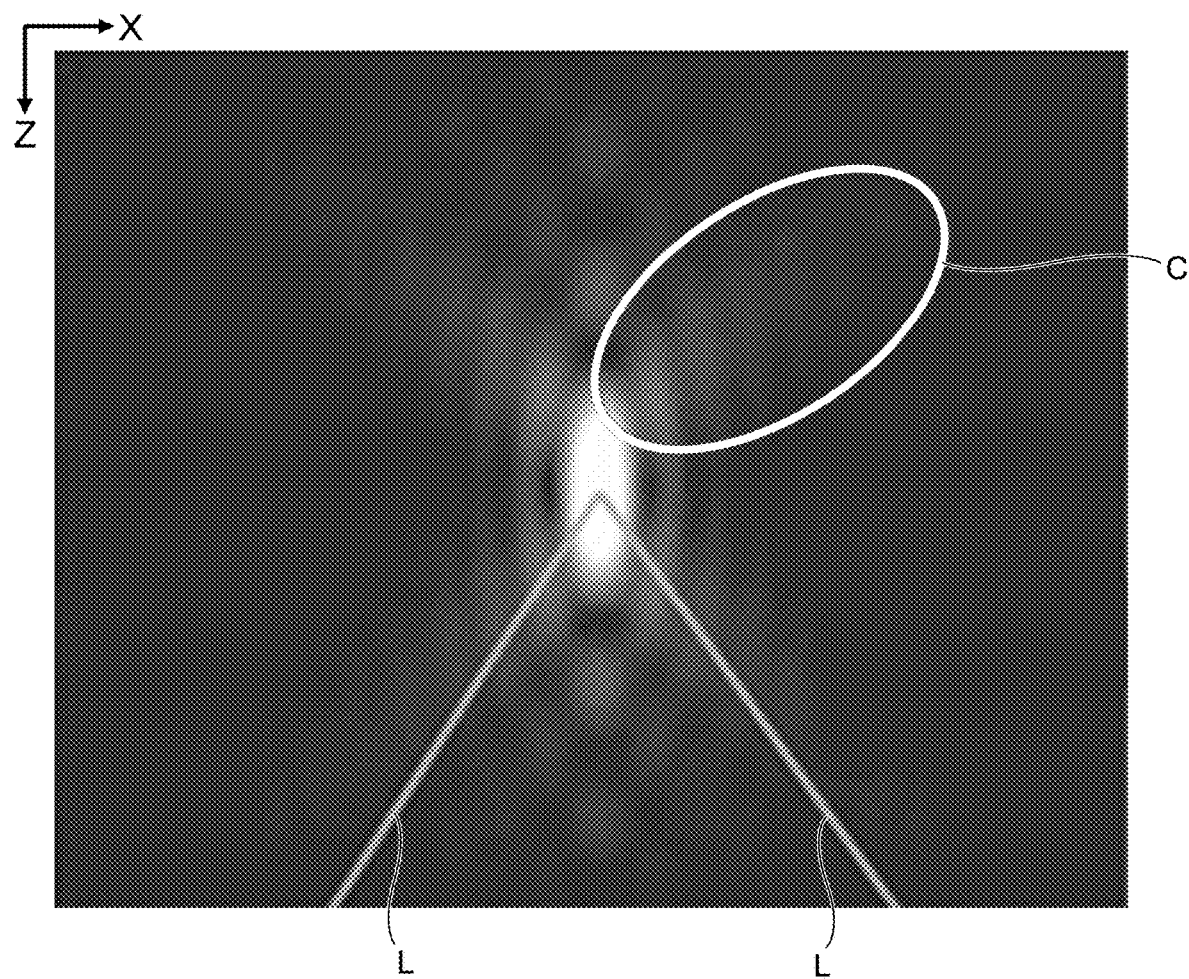
FIG. 10 illustrates an example of an image taken when a portion with high reflectivity and a portion with low reflectivity coexist in a visual field.

FIG. 8 is a partially enlarged view of a part (a frame f region) of FIG. 7. FIG. 9 is a partially enlarged view of an image subjected to image restoration processing using the inverse filter.

As illustrated in FIG. 9, it can be confirmed that high-frequency noise increases in a dark area when a simple inverse filter is used. In the focus variation method, when such noise is present, it is not possible to distinguish between the noise and the reflection of the object to be measured, especially the reflection in a portion with low reflectivity, and therefore the noise appears as measurement error.

On the other hand, it can be confirmed that the problem of the noise is solved by using the Wiener filter as illustrated in FIG. 8. Therefore, high accuracy measurement becomes possible even in the portion with low reflectivity (an inclined surface in this example).

[Imaging Conditions]

In imaging the object to be measured, imaging is performed such that the luminance is not saturated in all the images. In other words, imaging is performed such that a maximum value and a minimum value of luminance of the object to be measured are within a dynamic range of imaging by the imaging device. Therefore, it is preferable to use a camera with a wide dynamic range (so-called wide dynamic range camera) as the camera used in the imaging device.

[Imaging Device]

In the above embodiment, the configuration is adopted in which a plurality of images different in focal position are taken while moving the optical head with respect to the object to be measured. However, a configuration is also possible in which the optical head is fixed and the object to be measured is moved for imaging. Alternatively, a configuration is also possible in which both the optical head and the object to be measured are moved for imaging. In other words, the movement to vary the focal position may be relative movement.

[Image Processing Device]

In the above embodiment, description is given of the case where the image processing device includes a computer that is different from the imaging device. However, the functions of the image processing device may be incorporated into the imaging device.

REFERENCE SIGNS LIST

1 . . . Three-dimensional shape measuring device, 10 . . . Imaging device, 11 . . . Stage, 11a . . . Mounting surface, 12 . . . Illumination light source, 13 . . . Illumination optical system, 14 . . . Image forming optical system, 15 . . . Camera, 16 . . . Focus drive unit, 17 . . . Operating unit, 18 . . . Controller, 20 . . . Illumination lens, 21 . . . Beam splitter, 22 . . . Aperture diaphragm, 23 . . . Objective lens, 24 . . . Image forming lens, 100 . . . Image processing device, 100A . . . Image acquiring unit, 100B . . . Preprocessing unit, 100C . . . Three-dimensional shape data generating unit, 101 . . . Processor, 102 . . . Main storage device, 103 . . . Auxiliary storage device, 104 . . . Input device, 105 . . . Output device, 106 . . . Input/output interface, 200 . . . Pinhole illumination, 201 . . . Light source, 202 . . . Condenser lens, 203 . . . Pinhole plate, 204 . . . Pinhole, Ob . . . Object to be measured

What is claimed is:

1. An image processing device for processing a plurality of images of an object to be measured, the plurality of images being taken while varying a focal position, the image processing device comprising:
   an image acquiring unit configured to acquire the plurality of images of the object to be measured;
   an image processing unit configured to process the plurality of images to correct blurring in the images based on a point spread function for each focal position of an optical system in an imaging device that takes the plurality of images; and
   a three-dimensional shape data generating unit configured to calculate, for the plurality of images after correction of the blurring, an evaluation value for a focusing degree for each pixel and generate three-dimensional shape data of the object to be measured based on the calculated evaluation value for the focusing degree for each pixel.

2. The image processing device according to claim 1, wherein the image processing unit applies, to the images in a frequency domain obtained by Fourier transform of the images, a frequency-domain restoration filter based on the point spread function to correct the images in the frequency domain, and performs inverse Fourier transform on the corrected images in the frequency domain to correct the blurring in the images.

3. The image processing device according to claim 2, wherein a frequency-domain inverse filter is calculated from the point spread function in the frequency domain that is obtained by the Fourier transform of the point spread function, and the calculated frequency-domain inverse filter is set as the frequency-domain restoration filter.

4. The image processing device according to claim 2, wherein a frequency-domain Wiener filter is calculated from the point spread function in the frequency domain that is obtained by the Fourier transform of the point spread function, and the calculated Frequency-domain Wiener filter is set as the frequency-domain restoration filter.

5. The image processing device according to claim 4, wherein
the Wiener filter is calculated by a following expression:

$$PSF_f^*(\omega_x,\omega_y,\omega_z)/\{PSF_f(\omega_x,\omega_y,\omega_z)PSF_f^*(\omega_x,\omega_y,\omega_z)+SN\}$$

where
PSF(x,y,z) is voxel data of the point spread function,
$PSF_f(\omega_x,\omega_y,\omega_z)$ is an image of PSF(x,y,z) mapped by Fourier transform,
$PSF_f^*(\omega_x,\omega_y,\omega_z)$ is a complex conjugate of $PSF_f(\omega_x,\omega_y,\omega_z)$, and
SN is a constant.

6. The image processing device according to claim 5, wherein the constant SN is set experimentally.

7. The image processing device according to claim 1, wherein the image processing unit processes voxel data of the object to be measured based on voxel data of the point spread function to correct the blurring in the plurality of images.

8. The image processing device according to claim 7, wherein, when the voxel data of the point spread function is smaller in size than the voxel data of the object to be measured, the image processing unit adjusts the voxel data of the point spread function to be identical in size to the voxel data of the object to be measured by zero padding.

9. The image processing device according to claim 1, wherein the point spread function is acquired by setting a luminescent point on an optical axis of the optical system and imaging the luminescent point while moving the imaging device relatively to the luminescent point.

10. The image processing device according to claim 9, wherein the luminescent point has a diameter that is set to be equal to or less than optical resolution of the imaging device through the optical system.

11. The image processing device according to claim 9, wherein the luminescent point is formed by a pinhole illumination or a fluorescent bead.

12. The image processing device according to claim 1, wherein the image processing unit acquires information on temperature when the object to be measured is imaged, and corrects the blurring in the plurality of images based on the point spread function corresponding to the acquired temperature.

13. The image processing device according to claim 1, wherein the plurality of images of the object to be measured are taken such that a maximum value and a minimum value of luminance of the object to be measured are within a dynamic range of imaging by the imaging device.

14. A three-dimensional shape measuring device, comprising:
   an imaging device configured to take a plurality of images of an object to be measured set on an optical axis of the imaging device while moving relatively to the object to be measured, the plurality of images being different in focal position; and
   the image processing device according to claim 1, the image processing device being configured to process the plurality of images of the object to be measured taken by the imaging device.

15. An image processing method of processing a plurality of images of an object to be measured, the plurality of images being taken while varying a focal position, the image processing method comprising:
   acquiring the plurality of images of the object to be measured;

correcting blurring in the plurality of images based on a point spread function for each focal position of an optical system in an imaging device that takes the plurality of images; and calculating, for the plurality of images after correction of the blurring, an evaluation value for a focusing degree for each pixel and generating three-dimensional shape data of the object to be measured based on the calculated evaluation value for the focusing degree for each pixel.

* * * * *